United States Patent [19]
Sugimoto et al.

[11] Patent Number: 5,242,333
[45] Date of Patent: Sep. 7, 1993

[54] ROCKER-PIN TYPE FRICTION GEARING CHAIN

[75] Inventors: Yoshiaki Sugimoto; Hiroki Ishida, both of Tokorozawa; Toshihiro Hosokawa, Takatsuki; Nobuyuki Fujimoto, Hanno, all of Japan

[73] Assignee: Tsubakimoto Chain Co., Osaka, Japan

[21] Appl. No.: 801,448

[22] Filed: Dec. 2, 1991

[30] Foreign Application Priority Data

Nov. 30, 1990 [JP] Japan .............................. 2-126443[U]

[51] Int. Cl.⁵ .............................................. F16G 13/00
[52] U.S. Cl. .................................... 474/212; 474/215
[58] Field of Search ................ 474/206, 212, 213–217

[56] References Cited

U.S. PATENT DOCUMENTS 4,507,106  3/1985  Cole, Jr. ............................. 474/215
4,801,289  1/1989  Sugimoto et al. ................... 474/215

*Primary Examiner*—Thuy M. Bui
*Attorney, Agent, or Firm*—Flynn, Thiel, Boutell & Tanis

[57] ABSTRACT

A rocker-pin type continuously variable transmission chain having a plurality of link plates connected endlessly by rocker pins which project into pin insertion holes formed in the link plates. Each pin insertion hole defines thereon a side load transmitting surface which engages an opposed side load transmitting surface on the rocker pin. These load transmitting surfaces on the rocker pin and hole have opposed center surface portions which are maintained free of contact with one another. A pair of concave surface portions are smoothly joined directly to opposite ends of the center surface portion of the hole, and project outwardly in opposite directions therefrom. A similar pair of convex surface portions are formed on the rocker pin, and are joined to opposite ends of the center surface portion thereof and project outwardly therefrom. The concave and convex surface portions are defined generally as partial elliptic surfaces which are generated about and symmetrically disposed with respect to a major axis of an ellipse, which major axis extend centrally of the bore in the lengthwise or longitudinal direction of the link plate. The elliptically shaped concave and convex surfaces directly engagingly contact one another, and create a wedge-like configuration which prevents rotation of the rocker pin relative to the bore, and provides for uniform load transmission over the extensive surface areas defined by the contacting convex and concave surface portions.

2 Claims, 3 Drawing Sheets 5,242,333

ROCKER-PIN TYPE FRICTION GEARING CHAIN

BACKGROUND OF THE INVENTION

1. Field of the Invention

The present invention is utilized as a steplessly variable transmission in which a wrapping transmission includes an endless chain.

2. Description of the Prior Art

Generally, a friction gearing chain drive, as illustrated by FIG. 1, comprises a driving shaft D and a driven shaft F spaced from one another and each being equipped with a pair of transmission sheaves P1, P1 and P2, P2, respectively, each having opposing cone surfaces. Such drive is utilized for gear ratio changes by expanding or contracting the facing gaps of the transmission sheaves P1, P1 and P2, P2 so that contacting positions between a plurality of friction gearing members B assembled with an endlessly wrapped transmission chain C disposed between both sheaves and the opposing cone surfaces of the transmission sheaves can be changed in response to the shifting of the transmission sheaves. The friction gearing chain is roughly classified into two types in accordance with the shape of the pins which endlessly connect a plurality of link plates constituting the transmission chain C; that is, a rocker-pin type and a round-pin type, and the rocker-pin type is adopted mainly for a silent chain. The present invention relates to a rocker-pin type friction gearing chain. A conventional rocker-pin type friction gearing chain is, as shown in Laid-open Japanese Patent Application No. 59-99142 (1984), and in corresponding U.S. Pat. No. 4,507,106, formed in such a manner that a traction load transmitting surface, at which a rocker pin and an insertion hole for the rocker pin as formed in a link plate contact and engage each other, is formed by a continuous surface which is made by continuously connecting a plurality of arc-shaped surfaces having different curvatures. It is the aim of this arrangement to prevent a mutual rotational displacement between the rocker pin and the link plate. However, as explained in the above-mentioned application No. 59-99142, it is extremely difficult to manufacture a plurality of arcshaped surfaces having different curvatures so as to contact and engage at all surfaces.

In view of this, in order to eliminate such difficulty, the arrangement disclosed in U.S. Pat. No. 4,801,289, as owned by the assignee hereof, has been invented.

That is, aforementioned U.S. Pat. No. 4,801,289 shows, as shown in FIG. 3 hereof, that a rocker pin P has a plane portion 1 formed by removing a central portion of a traction load transmitting surface of the rocker pin and a pair of arc-shaped convex surfaces 2, 2 each continuously connected to respective ends of the plane portion 1 and formed concentric about a common axis. To the contrary, the insertion hole H is formed to include a concave curved surface 3 which faces but does not contact the plane portion 1, and further includes arc-shaped concave surfaces 4, 4 continuously connected to opposite ends of the concave curved surface 3. The arc-shaped concave surfaces 4, 4 engagedly contact with the pair of arc-shaped convex surfaces 2, 2 so that the arc-shaped convex surfaces 2, 2 and the arcshaped concave surfaces 4, 4 form the traction load transmitting surface. The concave curved surface 3 and the arc-shaped concave surfaces 4, 4 have different curvatures.

Accordingly, the mutual rotational displacement between the rocker pin and the link plate is restricted in such a way that inflection points 5 between the plane portion 1 of the rocker pin and the arc-shaped convex surfaces 2, 2 is engaged with inflection points 6 between the concave curved surface 3 and the arc-shaped concave surfaces 4, 4.

As explained above, and in accordance with the technical content disclosed in U.S. Pat. No. 4,801,289, the arc-shaped convex surfaces 2, 2 and the arc-shaped concave surfaces 4, 4 are formed to be concentric arc-shaped surfaces. Therefore it becomes possible to resolve the technical problem disclosed in Laid-open Japanese Patent Application 59-99142 in view of easiness in manufacturing so as to be able to engagedly contact. However, since the arc-shaped convex surfaces 2, 2 and the arc-shaped concave surfaces 4, 4 are formed to be concentric arc-shaped surfaces, a restriction force for preventing mutual rotational displacement is not expected because the engaged contacting surface is of a freely rotatable type. Therefore a load caused for counteracting the mutual rotational displacement concentrates on an engaging portion at the inflection points 5 and the inflection points 6. Thus, a crack is generated from this engaging point of the inflection points 5 and 6, and it is feared that this crack in turn may cause a breakage of the link plate.

SUMMARY OF THE INVENTION

In order to resolve the above problem encountered in the above-described prior art, the present invention has replaced the concentric arc-shaped convex surfaces 2, 2 and arc-shaped concave surfaces 4, 4 disclosed in the technical content of U.S. Pat. No. 4,801,289 with a pair of elliptic curved surfaces which are symmetrically disposed with respect to a major axis of an ellipse.

That is, in more detail, a pair of opposed first elliptic curved surfaces are continuously connected to one ends of the respective plane portion 1 and concave curved surface 3 so as to engagedly contact one another, and a pair of opposed second elliptic curved surfaces are continuously connected to the other ends of the respective plane portion 1 and concave curved surface 3 so as to engagedly contact one another, which first and second surfaces are formed by a pair of elliptic curved surfaces facing with each other with respect to the major axis so as to form a wedge shape or zone therebetween.

When the rocker pin is inserted into the insertion hole, a first elliptic convex surface and a second elliptic convex surface of the rocker pin engagingly contact with a first elliptic concave surface and a second elliptic concave surface of the insertion hole so that the rocker pin is firmly fixed in the wedge shape. Therefore the restriction force preventing mutual rotational displacement of the rocker pin and the insertion hole acting at the traction load transmitting surface is generated by the restriction force caused by means of a wedge function, and since this wedge restriction force is uniformly loaded on all of the first elliptic curved surface and the second elliptic curved surface, the counteracting load caused by restricting the rotational displacement can be prevented from being concentrated on the inflection points 5 and 6. Further, since an elliptic curved surface has a smaller curvature compared with a circular arc-shaped surface, the distribution of the pressing force of the rocker pin with respect to the center of the transmission sheave is equalized so as to increase thrust force, thus enlarging the frictional transmitting force.

DETAILED DESCRIPTION

Figure 1:
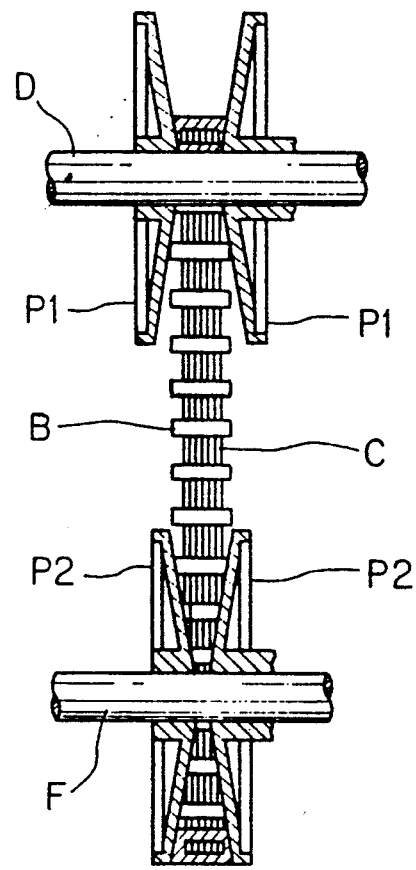
FIG. 1 is a cross-sectional view illustrating a conventional steplessly variable transmission employing a frictional transmission chain.
Figure 2:
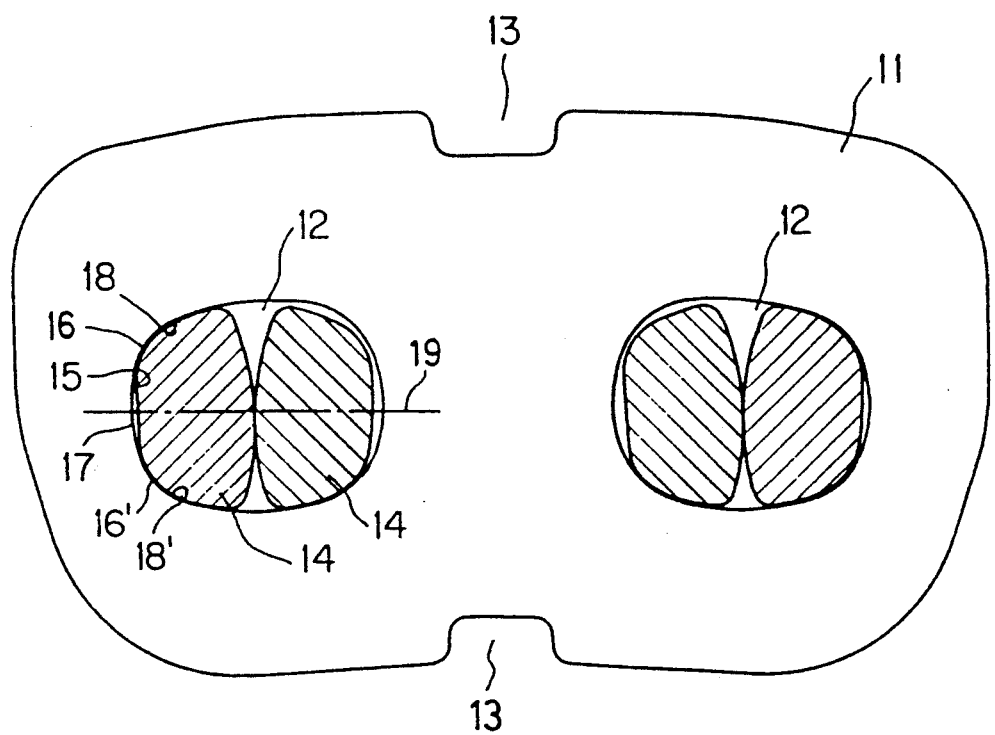
FIG. 2 is an enlarged front view showing an embodiment of the present invention in which a rocker inserted into a link plate.
Figure 3:
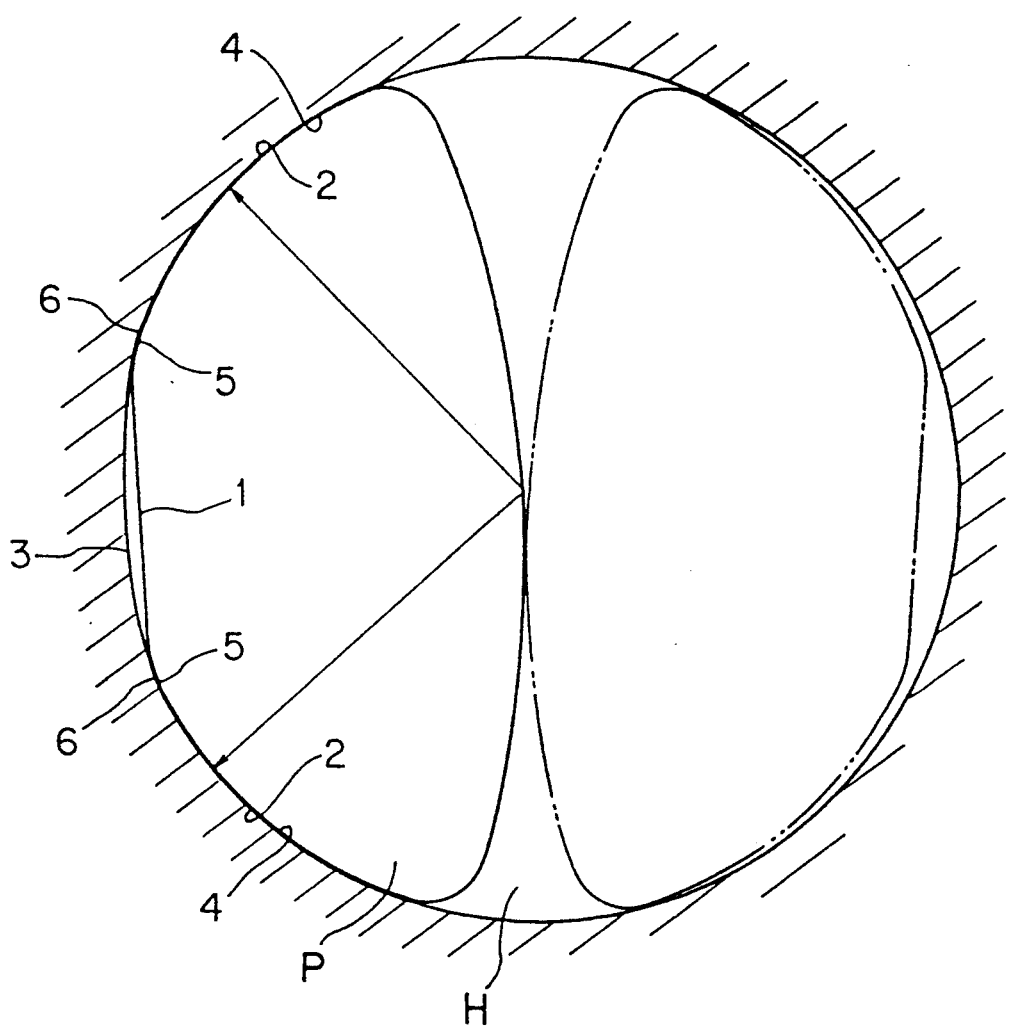
FIG. 3 is an enlarged front view showing an example of the prior art wherein a rocker pin is inserted in an insertion hole of a link plate.

FIG. 2 is an enlarged front view showing a link plate 11 with rocker pins 14 being inserted therein, wherein the link plate 11 is formed with two insertion holes 12, 12 for inserting back-to-back rocker pins 14, 14, and there are provided at central portions of upper and lower sides of the link plate 11 a pair of cutout portions 13, 13 for engaging friction gearing members (such as members B of FIG. 1) each having an I-shaped cross section.

Moreover, the connecting pins 14, 14 which are inserted into the insertion holes 12, 12, respectively, consist of a pair of rocker pins. The outer peripheral configuration of the traction load transmitting side surface of the rocker pin 14 is formed to include a nonload transmitting surface portion 15 which is disposed at a central portion of the rocker pin and a pair of load transmitting convex surface portions 16, 16' which are continuously connected with opposite ends of the non-load transmitting surface portion 15. The inner peripheral configuration of the traction load transmitting side surface of the insertion hole 12 is formed to include a non-load transmitting surface portion 17 which is a concave curved surface which faces but does not contact the non-load transmitting surface portion 15 of the rocker pin, and a pair of load transmitting concave surface portions 18, 18' which are engagedly contacted with the respective load transmitting surface portions 16, 16' of the rocker pin. The load transmitting concave surface portions 18, 18' are continuously connected to opposite ends of the non-load transmitting surface portion 17.

The load transmitting convex surface portions 16, 16' on the rocker pin, and the load transmitting concave surface portion 18, 18' on the insertion hole, which surfaces 18, 18' respectively engagedly contact the load transmitting convex surfaces 16, 16', are formed by pairs of opposed elliptic curved surfaces positioned symmetrically with respect to a major axis 19 of an ellipse, which major axis 19 extends in the lengthwise or longitudinal direction of the link plate and insertion hole. Thus, the load transmitting elliptic curves surfaces 16, 16' and 18, 18' are respectively formed in opposition so as to form a wedge shape with the non-load transmitting surface portions 15, 17 respectively therebetween.

Accordingly, the load transmitting convex surface portions 16, 16' of the rocker pin are engagedly contacted with the load transmitting concave convex surface portions 18, 18' of the insertion hole so as to have a deep thrust by being inserted into the wedge shape or zone defined between the surface portions 18, 18'.

In accordance with the present invention, since the traction load transmitting concave surfaces 18, 18' of the insertion hole 12 are disposed so as to sandwich the rocker pin therebetween, the non-load transmitting surface portion 17 does not contact with the rocker pin, and compared with the manufacturing process in accordance with the technical teaching disclosed in the Official Gazette of Laid-open Japanese Patent Application 59-99142 in which three arc-shaped surface having different curvatures are required to engagedly contact the surface of the rocker pin at the same time, manufacturing of the present invention is easy since two separated load transmitting concave surfaces are relatively easily manufactured so as to contact with the rocker pin, and furthermore, since the load transmitting concave surfaces are formed so as to substantially face one another in a wedge shape, to provide the non-load transmitting surface portion 17 between the load transmitting concave surfaces 18, 18' makes it easy to insert the rocker pin into the wedge shape, and therefore the wedge restricting force caused between the load transmitting concave surface of the insertion hole and the load transmitting convex surface of the rocker pin is so increased that they are engagedly contacted at their entire surfaces. Thus, it becomes possible to positively prevent mutual rotational displacement between the insertion hole and the rocker pin at the engaged contacting surfaces. Also, the restriction force is uniformly distributed or loaded on all contacting surfaces of the wedge-like engagement between the insertion hole and the rocker pin, and therefore such undesirable action as the load being concentrated on the inflection points as in the technique of U.S. Pat. No. 4,801,289 is not caused. Accordingly, it is possible to prevent not only generation of a crack from the insertion hole of the link plate but also accidental breakage of the link plate. Further, an elliptic curve surface has a smaller curvature compared with a circular arc-shaped surface, and therefore the distribution of pressing force of the rocker pin with respect to the link plate acting toward the center of the transmission sheave is equalized. Thus it is possible to increase the thrust force, and as a result, the frictional transmission force of the friction gearing member against the transmission sheave is enlarged, with remarkable improvement in transmission efficiency.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A rocker-pin type friction gearing chain which includes a plurality of friction gearing members mounted on a plurality of link plates which are respectively connected at opposite ends by means of a pair of rocker pins so as to form an endless chain, said rocker-pin type friction gearing chain comprising:

said link plate defining therein an insertion hole for the rocker pin, an inner peripheral surface of the insertion hole defining thereon a traction load transmitting side surface which consists of a non-load transmitting surface portion which does not contact the rocker pin and two load transmitting concave surface portions which are located on opposite ends of the nonload transmitting surface portion and are continuously connected thereto and extend away therefrom, the two load transmitting concave surface portions engagedly contacting the rocker pin, the load transmitting concave surface portions being formed by a pair of elliptical concave surfaces which substantially face one another so as to form a wedge shape, and the pair of elliptical concave surfaces being symmetrically positioned with respect to a major axis of an ellipse, which said major axis extends centrally through the insertion hole in the longitudinal direction of the link plate.

2. An improved rocker pin type continuously variable transmission chain having a plurality of frictionally driven blocks and a plurality of link plates connected endlessly by paired rocker pins, the improved chain comprising:

the rocker pin each having a load transmitting surface formed by a central non-loading transmitting surface portion which is generally flat, and a pair of load transmitting convex surface portions which are joined to opposite ends of the central surface portion and extend away therefrom;

the link plates each having rocker pin insertion bores formed in part to closely fit the convex surface portions of the rocker pins and form a load transmitting side surface for each bore;

the load transmitting side surface of each bore having a center arcuate surface portion which opposes but does not contact the central surface portion on the rocker pin;

the load transmitting side surface of each bore also having a pair of concave surface portions which are smoothly joined to opposite ends of the center surface portion and extend away therefrom;

the pair of concave surface portions being of identical elliptical configurations which are generated relative to and symmetrically positioned with respect to a major axis of an ellipse, said major axis extending centrally of the insertion bore in the lengthwise direction of the link plate; and the pair of convex surface portions also being of elliptical configurations substantially identical to said pair of concave surface portions, whereby the pair of concave and convex surface portions define a nonrotatable wedge-like engagement between the rocker pin and bore with the load forces being transmitted by extensive surface contact areas as defined by the engagement between the concave and convex surface portions.

* * * * *